United States Patent [19]

Simmons

[11] Patent Number: 5,320,650
[45] Date of Patent: Jun. 14, 1994

[54] FLUORINATED AROMATIC POLYIMIDE, POLYAMIDE AND POLYAMIDE-IMIDE GAS SEPARATION MEMBRANES

[75] Inventor: John W. Simmons, Wilmington, Del.

[73] Assignees: E. I. du Pont de Nemours and Company, Wilmington, Del.; L'Air Liquide S.A., Paris Cedex, France

[21] Appl. No.: 56,778

[22] Filed: May 4, 1993

[51] Int. Cl.$^5$ .............................................. B01D 53/22
[52] U.S. Cl. .................................. 96/14; 210/500.38; 210/500.39; 521/64
[58] Field of Search ............... 55/158, 16; 210/500.39, 210/500.38; 526/64

[56] References Cited

U.S. PATENT DOCUMENTS

| | | | |
|---|---|---|---|
| 5,089,593 | 2/1992 | Fjare et al. | 528/88 |
| 5,112,941 | 5/1992 | Kasai et al. | 55/158 |
| 5,165,963 | 11/1992 | Matsumoto et al. | 55/158 |
| 5,178,650 | 1/1993 | Hayes | 55/158 |
| 5,178,940 | 1/1993 | Matsumoto et al. | 428/306.6 |

FOREIGN PATENT DOCUMENTS

| | | | |
|---|---|---|---|
| 2063228 | 10/1992 | Canada | |
| 1-246247 | 10/1989 | Japan | C07C 93/14 |
| 1-261422 | 10/1989 | Japan | C08G 73/10 |

OTHER PUBLICATIONS

"Permeability and Permselectivity of Gases in Fluorinated and Non-Fluorinated Polyimides" by K. Tanaka, H. Kita, M. Okano and K. Okamoto, Polymer, 1992, vol. 33, No. 3, (pp. 585-592).

"Effects of Structural Features and Humidity on the Dielectric Constant of Polyimides" by Frank W. Mercer and Timothy Goodman, High Performance Polymers, vol. 3, No. 4, 1991 (pp. 297-310).

Primary Examiner—Morton Foelak
Attorney, Agent, or Firm—Cary A. Levitt

[57] ABSTRACT

Novel fluorinated aromatic polyimide, polyamide and polyamide-imide gas separation membranes and the process of using such membranes to separate one or more gases from a gaseous mixture is disclosed. The polyimides, polyamides and polyamide-imides are formed from diamines of the formula

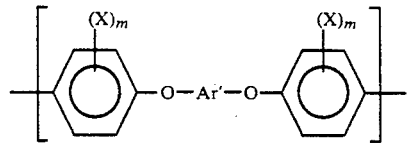

where Ar' is any aromatic diol moiety and X is independently fluorinated alkyl groups having 1 to 6 carbon atoms, most preferably a trifluoromethyl group, m is an integer from 1 to 4, preferably 1.

16 Claims, No Drawings

FLUORINATED AROMATIC POLYIMIDE, POLYAMIDE AND POLYAMIDE-IMIDE GAS SEPARATION MEMBRANES

FIELD OF THE INVENTION

The present invention relates to fluorinated aromatic polyimide, polyamide and polyamide-imide gas separation membranes and the process for separating one or more gases from a gaseous mixture using such membranes. The polyimides, polyamides and polyamide-imides are derived from diamines which incorporate fluorinated aromatic diamines in the polymer chain. The inventive gas separation membranes exhibit exceptionally good permeation rates with good selectivity.

PRIOR ART

U.S. Pat. No. 5,089,593 discloses polyimides containing the 4,4'-bis(4-amino-2-trifluoromethyl phenoxy) biphenyl moiety.

Japanese Laid-open Patent Application (Kokai) No. 1-261422 discloses a fluorinated aromatic polyimide which contains the following units:

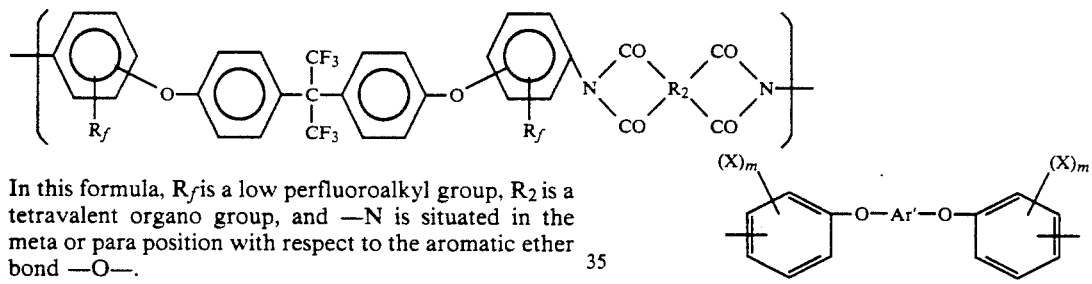

In this formula, $R_f$ is a low perfluoroalkyl group, $R_2$ is a tetravalent organo group, and —N is situated in the meta or para position with respect to the aromatic ether bond —O—.

"Effect of Structural Features and Humidity on the Dielectric Constant of Polyimides" by Frank W. Mercer and Timothy Goodman, High Performance Polymers, Vol. 3, No. 4, 1991 discloses a variety of fluorinated polymers including the following:

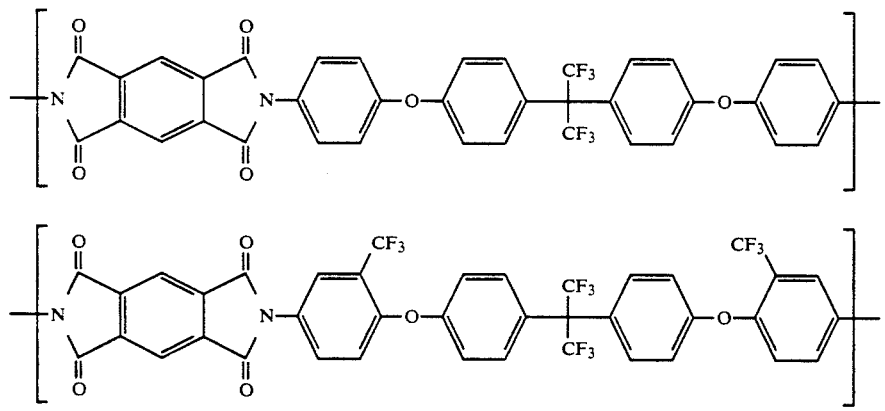

However, the prior art does not disclose gas separation membranes made from such fluorinated aromatic polymers.

SUMMARY OF THE INVENTION

The present invention relates to certain fluorinated aromatic polyimide, polyamide and polyamide-imide separation membranes particularly useful for separating gases and the process for using them. This class of membrane materials compositionally contain diamines which incorporate fluorinated aromatic units in the polymer chain, particularly aromatic diamines containing pendant trifluoromethyl groups on the aromatic chains. Membranes formed from this class of polyimide materials exhibit superior gas permeability and good selectivity. It is believed that the high permeabilities of some gases from multicomponent mixtures is due to the molecular free volume in the polymer which is created by the substituents on the diamines. These polymers also exhibit improved solubility which facilitates their production of ion exchange membranes.

DETAILED DESCRIPTION OF THE INVENTION

The present invention relates to the discovery that gas separation membranes exhibiting exceptional gas permeability can be obtained by forming gas separation membranes from fluorinated aromatic polyimides, polyamides and polyamide-imides which incorporate a substituted diamine having the structural formula $H_2N—Ar—NH_2$ where —Ar— is

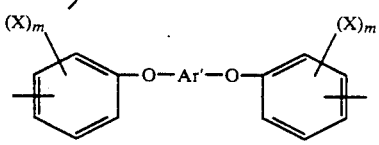

where —Ar'— is any aromatic diol moiety, including

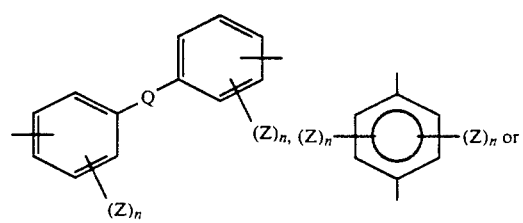

-continued

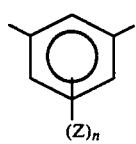

where —Q— is nothing or R'. —R'— is

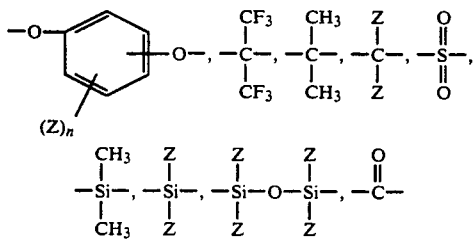

or mixtures thereof, where X is independently fluorinated alkyl groups having 1 to 6 carbon atoms preferably trifluoromethyl groups, and Z is independently hydrogen, alkyl groups or fluorinated alkyl groups having 1 to 6 carbon atoms, preferably hydrogen or a tertiary butyl group, where m is independently an integer from 1 to 4, preferably 1, n is independently an integer from 0 to 4, preferably 0.

The alkyl-substituted aromatic diamine may be mixed with other aromatic diamines, such as, for example, aromatic diamines having the general structural formula $H_2N-Ar''-NH_2$ where Ar'' is, for example,

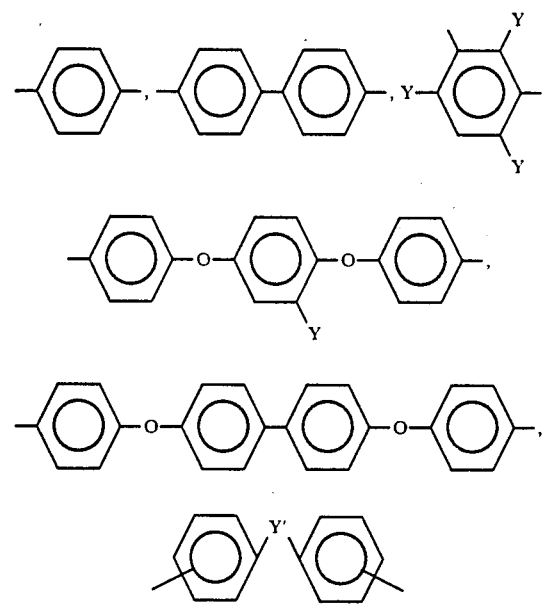

or mixtures thereof, where Y is an alkyl group having 1 to 6 carbon atoms or a phenyl group and Y' is —O—, —S—,

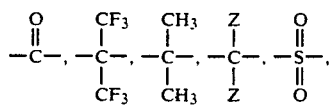

or mixtures thereof. The foregoing examples are not limiting; Ar'' may also be other aromatic constituents which are known in the art.

The diamines used in the inventive gas separation membranes may be synthesized as shown in the following exemplary diagram using a standard condensation reaction of an aromatic idol (1) with an activated chloronitrobenzotrifluoride (2), followed by the hydrogenation of the dinitro moieties (3) into diamines (4):

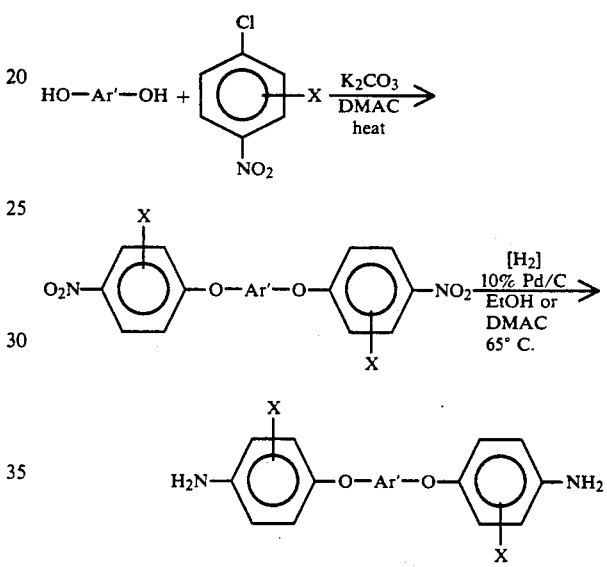

Gas separation membranes prepared from such diamines possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said diamines in the polyimide chain. In particular, the fluorinated substituents on the diamines increase the molecular free volume of the polymer.

Generally, an inverse relationship between the gas permeation rate (flux) and the selectivity of said gas over other gases in a multicomponent gas mixture has been exhibited within polymer classes, such as polyimides, polyamides and polyamide-imides. Because of this, prior art polyimide, polyamide and polyamide-imide gas separation membranes tend to exhibit either high gas permeation rates at the sacrifice of high gas selectivities or high gas selectivities at the sacrifice of high permeation rates. It would be highly desirable for gas separation membranes to exhibit high gas permeation rate while maintaining high gas selectivities.

The present invention circumvents the above shortcomings and provides exceptionally high permeation polyimide, polyamide and polyamide-imide gas separation membranes while maintaining good selectivity.

Polyimide materials useful in the present invention contain at least one of the following repeating units:

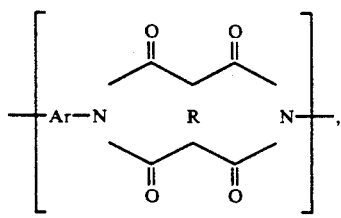

where —Ar— is an aromatic diamine moiety having the following formula:

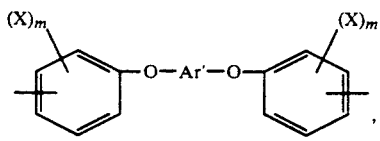

where —Ar'— is any aromatic diol moiety, including

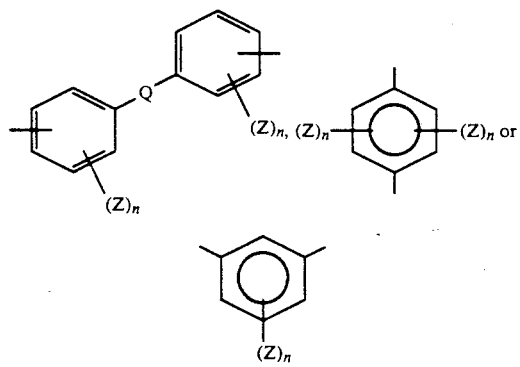

where Q is nothing or R', preferably nothing. —R'— is

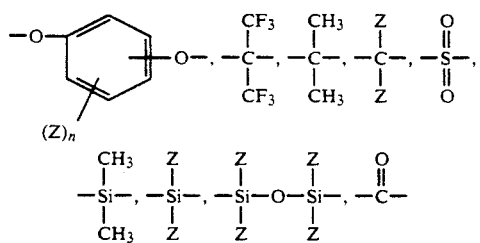

or mixtures thereof, where X is independently fluorinated alkyl groups having 1 to 6 carbon atoms, preferably trifluoromethyl groups, and Z is independently hydrogen, alkyl groups or fluorinated alkyl groups having 1 to 6 carbon atoms, preferably hydrogen or a tertiary butyl group, where m is independently an integer from 1 to 4, preferably 1, and n is independently an integer from 0 to 4, preferably 0.

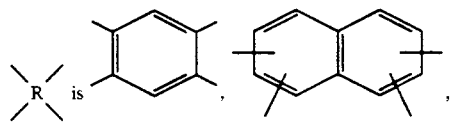

-continued

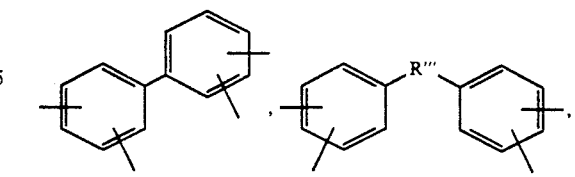

or mixtures thereof. R'''' is

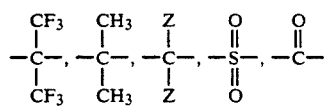

or mixtures thereof, preferably

In general, the polyimides of this invention have a weight average molecular weight within the preferred range of from about 10,000 up to about 200,000 and more preferably from about 50,000 up to about 100,000.

In the preferred process for preparing the polyimides of this invention, approximately equimolar quantities of a dianhydride and the diamine are reacted by well-established procedures known in the art. In general, this process involves the polycondensation of the diamine and the dianhydride followed by the dehydration of the resulting polyamic acid to form a polyimide.

Preferably, the diamine is first dissolved in a polymerization solvent medium and the dianhydride is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

The solvents which may be used in the polymerization process are organic solvents, preferably polar aprotic, whose functional groups do not react with either the dianhydride or diamine reactant to any appreciable extent, and in which either the dianhydride or diamine, preferably both, and the polymer are soluble. Examples of suitable solvents include N,N-dialkylcartoxylamide solvents such as N,N-dimethylformamide or N,N-dimethylacetamide; N-methyl-pyrrolidone; gamma-butyrolactone; pyridine; diglyme; and like materials as well as mixtures of such solvents.

Polymerization is conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with alcohol or water (e.g., methanol) and washed with additional alcohol or water.

The resulting polyimides may then, if desired, be blended using conventional solution blending technology to yield a blend having specifically tailored properties.

Polyamide materials useful in the present invention contain the repeating unit:

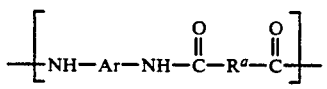

where Ar is as previously defined, and where $R^a$ is any aromatic diacid moiety such as

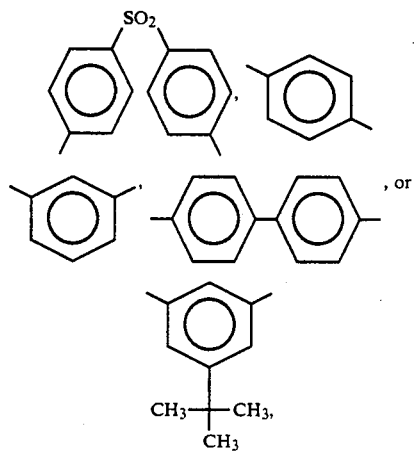

or mixtures thereof preferably

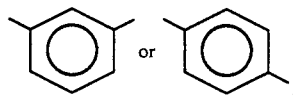

Polyamide-imide materials useful in the present invention contain the repeating unit:

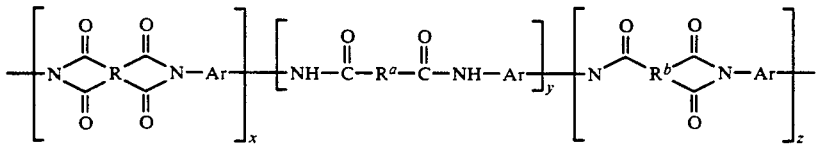

where Ar, R and $R^a$ are previously defined. $R^b$ is any triacid aromatic moiety, such as

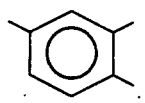

x, y and z are fractions where $x+y+z=1$. Ar may be different in each occurrence. The polyamide-imide materials may also be mixtures of the polyimides and polyamides described above.

The polyamides and polyamide-imides may be prepared by methods well known in the art.

The preferred polyimide, polyamide and polyamide-imide compositions of the present invention are soluble in a wide range of ordinary organic solvents. This is a great advantage for the ease of fabrication of industrially useful gas separation membranes. To prepared membranes in accordance with this invention, the polymer solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present. Insoluble polyimide compositions may be formed into gas separation membranes from their corresponding polyamic acid precursors followed by conversion to the polyimide.

Gas separation membranes prepared from the polyimide, polyamide and polyamide-imide materials of the present invention possess an excellent balance of gas permeation rates and selectivities for one gas over other gases in a multicomponent gas mixture. Generally, prior polyimide, polyamide and polyamide-imide gas separation materials exhibit an inverse relationship between the gas permeation rate and the selectivity of said gas over other gases in a multicomponent gas mixture. The preferred materials of the present invention (Example 1) have been found to have a permeation rate for oxygen of 15.45 Barrer while maintaining a good oxygen/nitrogen selectivity.

The polyimide, polyamide and polyamide-imide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability of gasses through membranes is defined as the Barrer (B).

$$1 \text{ Barrer} = \frac{10^{-10} \text{ cm}^3 \text{ (STP)} \times \text{cm}}{\text{cm}^2 \times \text{sec.} \times \text{cm. Hg.}}$$

wherein
cm³/sec (STP) is the flux (flow rate) in units volume per seconds of permeated gas at standard temperature and pressure,
cm. is the thickness of the film,
cm² is the area of film, and
cm. Hg is the pressure (or driving force).

The selectivity of a membrane in separating a two component fluid mixture is defined as the ratio of passage of the more readily passed component to the rate of passage of the less readily passed component. fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, a $O_2/N_2 = 10$ indicates that of nitrogen.

The invention will now be further illustrated by way of the following Examples, which are considered to be illustrative only, and non-limiting.

EXAMPLES

Polyimide films were made by the following method: To a stirred solution of Diamine in N-methylpyrrolidone ("NMP") (750 ml) was portionwise added Dianhydride under an inert atmosphere at room temperature. The solution of triethylamine (45.5 g, 0.45 mol), acetic anhydride (46.0 g, 0.45 mol) and N-methylpyrrolidone (100 ml) was added with rapid stirring at room temperature. The reaction mixture was heated to 100° C. for 2 hours. After cooling the reaction mixture to room temperature, the polymer was precipitated into water. The polymer was washed with water and methanol. The polymer was air-dried overnight at room temperature and then dried in a vacuum oven (20 inches mercury) at 230° C. for 3 hours.

A film of the above polyimide was cast from a 20% solution in N-methylpyrrolidone onto a glass plate at 120° C. with 15-mil ($38 \times 10^{-5}$ m) knife gap. The films were dried on the plate at 120° C. for 60-120 minutes, cooled to room temperature and air-dried overnight. The films were then further dried in a vacuum over (20 inches mercury) at 230° C. for 18 hours.

The above films (film thickness = 2.0 mils) were tested for mixed gas $O_2/N_2$ (21/79 mole ratio) permeabilities at 500 psig ($34.5 \times 10^{-5}$ Pa) at 25° C. The permeability of oxygen ($PO_2$) and the selectivity of oxygen to nitrogen ($PO_2/PN_2$) are reported in Table 1 below. The inherent viscosities of the polymers were determined in NMP (0.5 g/dL) (0.5 wt % polymer in NMP, dL/g). The reactants are defined in the Legend and the results are reported in Table 1 below:

TABLE 1

| Example | Diamine | Dian or Acid Cl | IV (dL/g) | PO$_2$ (Barrers) | PO$_2$/PN$_2$ |
|---|---|---|---|---|---|
| 1 | A | Z | 0.37 | 15.45 | 4.78 |
| 2 | A | Y | 0.47 | 3.65 | 5.87 |
| 3 | A | X | 0.43 | 4.61 | 6.12 |
| 4 | A | U | 0.54 | 6.05 | 4.72 |
| 5 | B | Z | 0.55 | 6.24 | 5.02 |
| 6 | B | Y | 0.72 | 2.05 | 6.29 |
| 7 | B | W | 0.90 | 1.47 | 4.62 |
| 8 | C | Y | 0.43 | 8.64 | 5.74 |
| 9 | C | V | 0.86 | 13.56 | 4.63 |

TABLE 1-continued

| Example | Diamine | Dian or Acid Cl | IV (dL/g) | PO$_2$ (Barrers) | PO$_2$/PN$_2$ |
|---|---|---|---|---|---|
| 10 | C | U | 0.61 | 11.11 | 4.25 |

LEGEND
A = 1,4-bis(4-amino-2-trifluoromethylphenoxy)-2-t-butylbenzene (2-t-Bu-FAPB-144)
B = 1,4-bis(4-amino-2-trifluoromethylphenoxy)benzene (FAPB-144)
C = 4,4'-bis(4-amino-2-trifluoromethylphenoxy)-3,3'-di-t-butylbiphenyl (FAPDB)
U = isophthaloyl/terephthaloyl chloride (70/30 ratio)
V = Biphenyl tetracarboxylic dianhydride (BPDA)
W = 5,5'-oxy-bis-1,3-isobenzofurandione (ODPA) (oxyphthalic dianhydride)
X = 3,3'4,4'-benzophenonetetracarboxylic acid dianhydride (BTDA)
Y = 5,5'-sulfonylbis-1,3-isobenzofurandione (DSDA) (diphenylsulfone dianhydride)
Z = 4,4'-[2,2,2-trifluoro-1(trifluoromethyl) ethylidene]bis(2,2-benzenedicarboxylic acid dianhydride) (6FDA)

What is claimed is:

1. A gas separation membrane formed from an aromatic polyimide comprising at least one repeating unit of the formula:

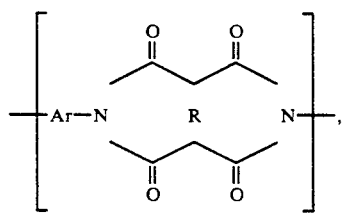

where —Ar— is an aromatic diamine moiety having the following formula:

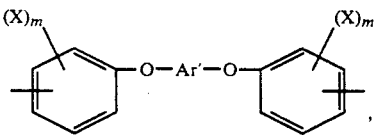

where —Ar'— is any aromatic diol moiety; X is independently fluorinated alkyl groups having 1 to 6 carbon atoms; m is independently an integer from 1 to 4;

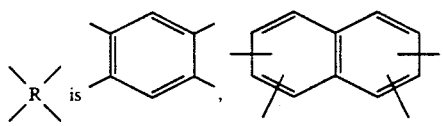

R is

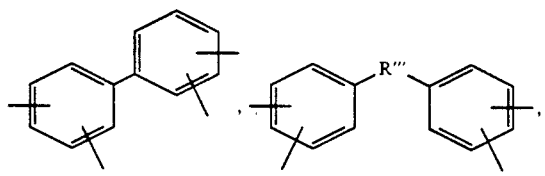

or mixtures thereof; and R''' is

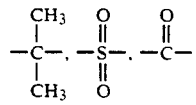

or mixtures thereof.

2. The membrane of claim 1 where X is a trifluoromethyl group and m=1.

3. The membrane of claim 2 where Ar is

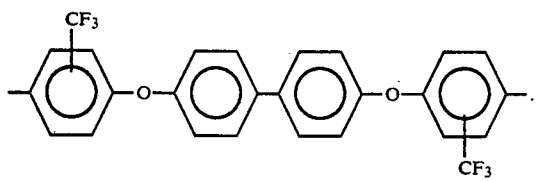

4. The membrane of claim 1 where Ar' is

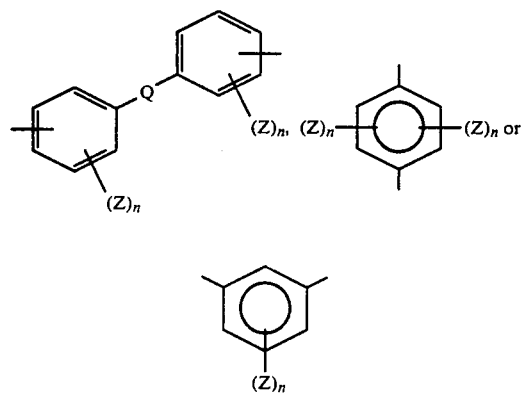

where Q=nothing or R' where

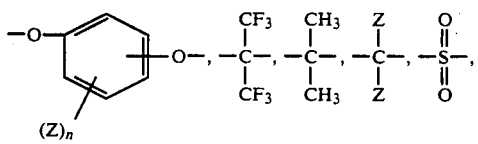

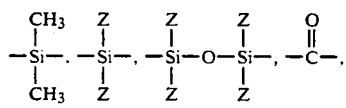

—R'— is
or mixtures thereof, Z is independently hydrogen, alkyl groups or fluorinated alkyl groups having 1 to 6 carbon atoms, and n is independently an integer from 0 to 4.

5. The membrane of claim 1 where Ar is

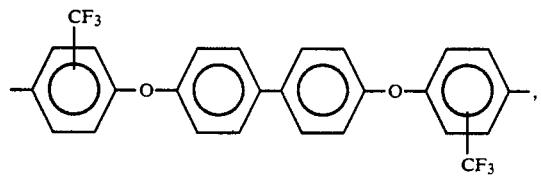

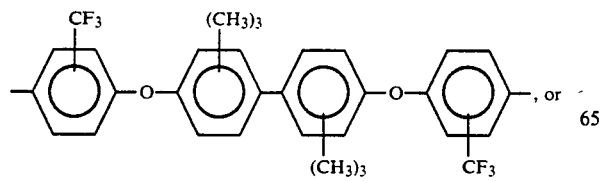

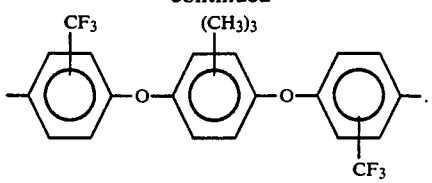

6. A gas separation membrane formed from an aromatic polyamide comprising at least one repeating unit of the formula:

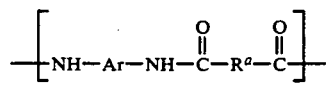

where —Ar— is an aromatic diamine moiety having the following formula:

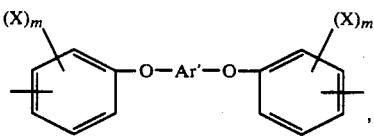

where —Ar'— is an aromatic diol moiety; X is independently fluorinated alkyl groups having 1 to 6 carbon atoms; m is independently an integer from 1 to 4; and where $R^a$ is any aromatic diacid moiety.

7. The membrane of claim 6 where X is a trifluoromethyl group and m=1.

8. The membrane of claim 7 where $R^a$ is

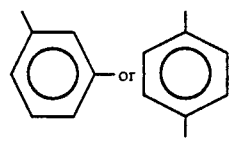

or mixtures thereof.

9. The membrane of claim 6 where Ar' is

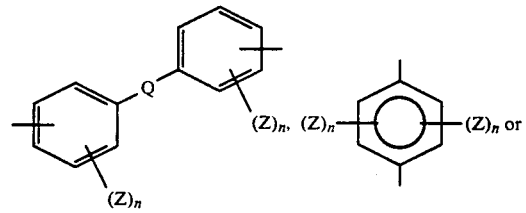

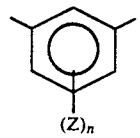

where Q=nothing or R' where —R'— is

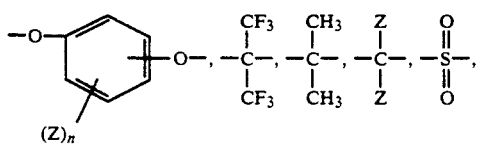

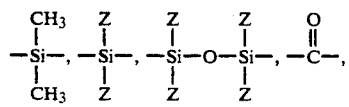

or mixtures thereof, Z is independently hydrogen, alkyl groups or fluorinated alkyl groups having 1 to 6 carbon atoms, and n is independently an integer from 0 to 4.

10. The membrane of claim 6 where Ar is

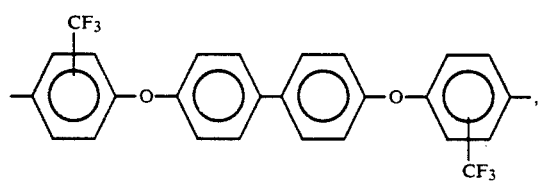

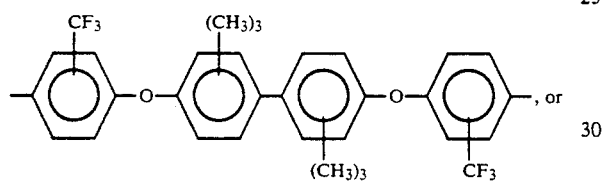

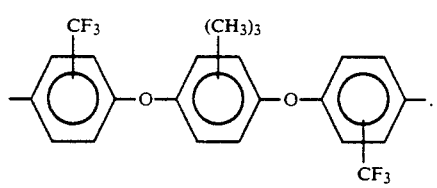

11. A gas separation membrane formed from an aromatic polyamide-imide comprising at least one repeating unit of the formula:

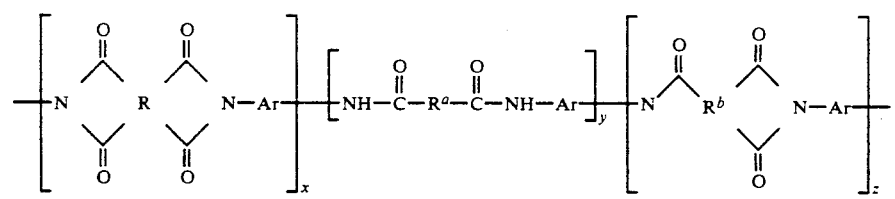

where Ar is independently an aromatic diamine moiety having the following formula:

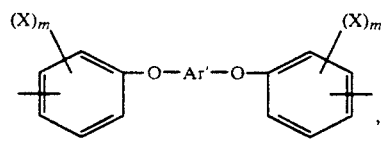

where —Ar'— is any aromatic diol moiety; X is independently fluorinated alkyl groups having 1 to 6 carbon atoms; m is independently an integer from 1 to 4; where

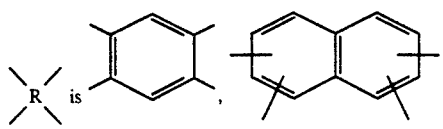

or mixtures thereof; and R''' is

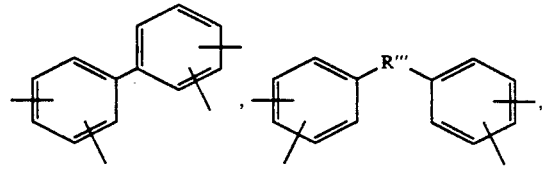

or mixture thereof; $R^a$ is any aromatic diacid moiety; $R^b$ is any aromatic triacid moiety; and x, y and z are fractions where $x+y+z=1.0$.

12. The membrane of claim 10 where X is a trifluoromethyl group and m=1.

13. The membrane of claim 10 where R is

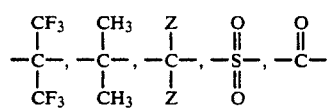

and R' is selected from

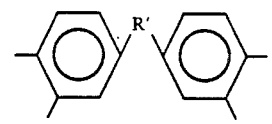

14. The membrane of claim 10 wherein R is

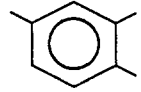

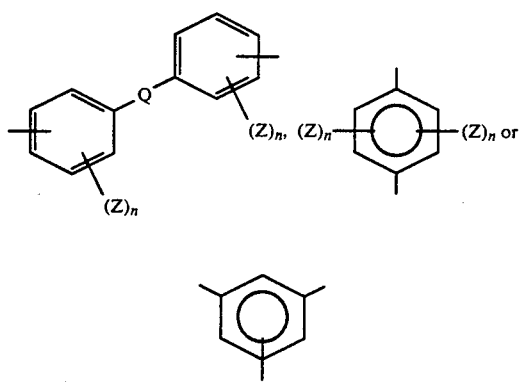
and z>0.
15. The membrane of claim 10 where Ar' is
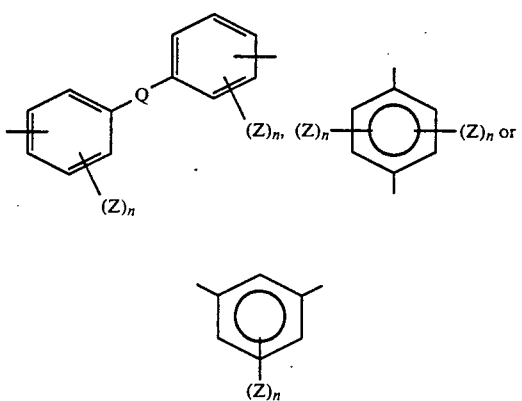
where Q=nothing or R' where —R'— is
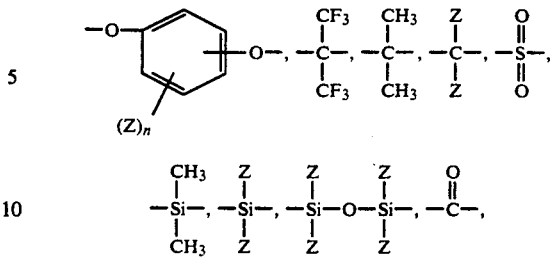
or mixtures thereof, Z is independently hydrogen, alkyl groups or fluorinated alkyl groups having 1 to 6 carbon atoms, and n is independently an integer from 0 to 4.
16. The membrane of claim 10 where Ar is
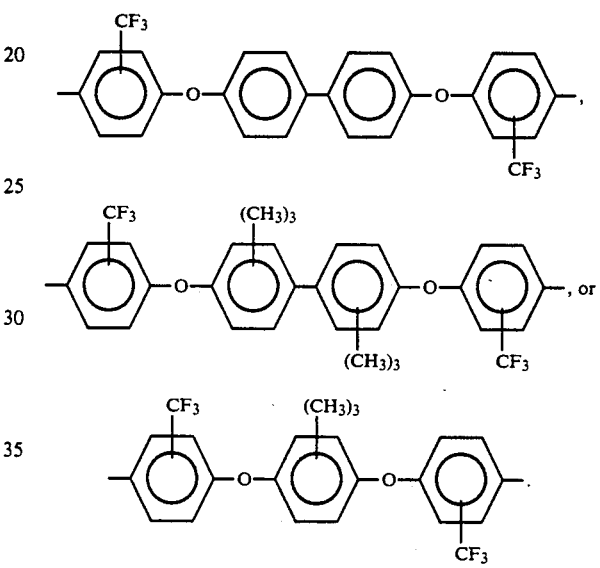
* * * * *

UNITED STATES PATENT AND TRADEMARK OFFICE
CERTIFICATE OF CORRECTION

PATENT NO. : 5,320,650
DATED : JUN. 14, 1994
INVENTOR(S) : Simmons

It is certified that error appears in the above-identified patent and that said Letters Patent is hereby corrected as shown below:

Claim 4, line 46 of column 11, delete "—R'— ".
Claim 4, line 32 of column 11, insert -- —R'— --.
Claim 12, line 26 of column 14, after the word claim, delete "10", and insert -- 11 --.
Claim 13, line 28 of column 14, after the word claim, delete "10", and insert -- 11 --.
Claim 14, line 43 of column 14, after the word claim, delete "10", and insert -- 11 --.
Claim 14, lines 1 to 19 of column 15, delete

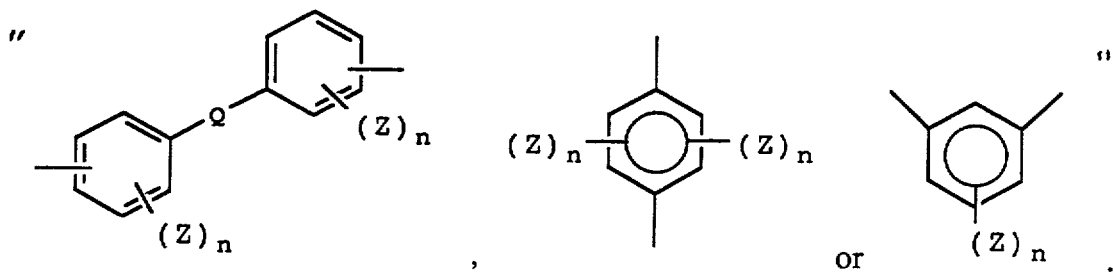

Claim 16, line 17 of column 16, after the word claim, delete "10", and insert -- 11 --.

Signed and Sealed this

Sixth Day of September, 1994

Attest:

BRUCE LEHMAN

*Attesting Officer*   *Commissioner of Patents and Trademarks*